Nov. 21, 1967  S. A. OKCUOGLU  3,353,418
ACCELERATION AND VELOCITY SURGE CONTROL MECHANISM
Filed Sept. 17, 1965
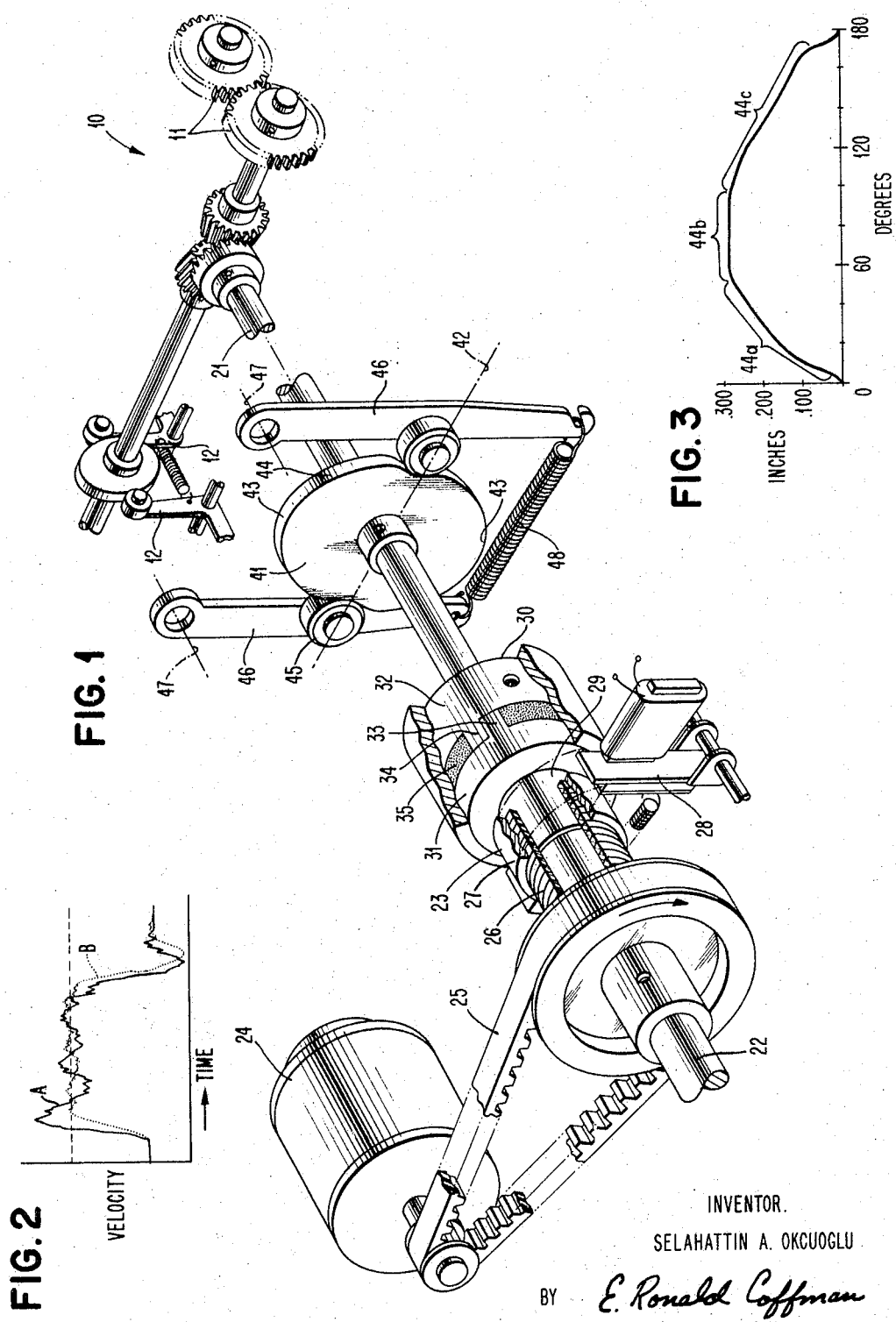
INVENTOR.
SELAHATTIN A. OKCUOGLU
BY E. Ronald Coffman
ATTORNEY.

United States Patent Office 3,353,418
Patented Nov. 21, 1967

3,353,418
ACCELERATION AND VELOCITY SURGE
CONTROL MECHANISM
Selahattin A. Okcuoglu, Lexington, Ky., assignor to International Business Machines Corporation, Armonk, N.Y., a corporation of New York
Filed Sept. 17, 1965, Ser. No. 488,150
5 Claims. (Cl. 74—125.5)

ABSTRACT OF THE DISCLOSURE

An artificial load cam is provided in the drive train of mechanism intermittently driven by a resiliently torque limited, positive acting clutch, to maintain and selectively release energy stored during an initial clutching acceleration and thereby control transient surge of the mechanism.

---

The mechanism of this invention permits accurate control of the velocity envelope of a cyclically operable machine that is intermittently connected to and accelerated by a power supply through a positive acting clutch.

Cyclical machines such as electric typewriters, calculators, and telegraph transmitters commonly employ positive acting clutches, e.g., spring clutches, dog clutches, jaw clutches, etc., for connecting a load shaft to a power shaft usually for a single revolution or less. By definition, a positive acting clutch causes high acceleration and thus induces high attendant forces in all parts accelerated. It is known that such high accelerations can be moderated by permitting some angular displacement or slippage in the system to increase the time over which the velocity change occurs. One particularly convenient form of slippage involves a resilient torque coupling which permits angular displacement in direct proportion to the acceleration forces generated, and thus to some extent is self-compensating. A resilient coupling, directly in series with the load shaft, inherently tends to store energy and to feed the stored energy back into the system as the acceleration loads abate. I have found that even where no resilient torque coupling is provided, returnable energy is stored in the deflection of supporting parts, drive belts, and other less-than-rigid components of the system. The structural deflection is not, however, an effective means of acceleration control due to its lack of predictability. Furthermore, the energy stored in structural deflection is distributed in many components which may be loaded and unloaded at varied times during the machine cycle, thus inducing many varied velocity control problems.

Whenever energy is released into a system, as by unloading of a resilient torque coupling, there is a tendency for the system to accelerate causing a surge or increase in velocity well above the desired constant design velocity. This surge is resisted only by the system inertial loads. Common spring clutches, and some dog clutches, provide effective shaft connection only in one direction of relative rotation, and acceleration due to energy fed to a system downstream of such clutches is resisted only by the inertia of the downstream portion of the system. In addition to energy stored during accelerations, energy may be stored in the system through working springs and through interaction with other systems.

Cyclically operable machines ordinarily require a correlation between time and shaft position to assure proper intersystem cooperation based on a time schedule. Furthermore, since cyclic systems usually involve high component speeds, dynamics are an important consideration in the prediction of such operation as a cam follower riding on an accelerating surface. It will thus be appreciated that the velocity source to such a system should be as predictable and constant as possible, especially in the more sophisticated machines.

Accordingly, it has been an object of my invention to provide simple means for controlling the velocity curve of positively clutched cyclically operable mechanisms.

A more specific object of my invention has been to provide simple mechanism for moderating the acceleration load induced by a positive acting clutch without introducing velocity surge due to stored energy in component parts.

I have found that energy stored in a resilient torque coupling during rotational acceleration, can be retained or released as desired preferably, the artificial load takes the form of a cam and a frictionless spring loaded follower by which torque can be applied as desired simply by selection of an appropriate cyclically oriented cam contour. It is within the broad contemplation of this invention, however, to employ other forms of artificial loading such as brakes or energy dissipating means that are operated according to a predetermined cyclic schedule.

These and other inventive objects and concepts will be more apparent to those skilled in the art upon reading and understanding the following description of an illustrative embodiment of my invention wherein reference is made to the accompanying drawings, of which:

FIGURE 1 is a perspective view of a typical system employing the velocity control mechanism of this invention;

FIGURE 2 is a pair of oscilloscope traces of actual velocity envelopes of a system such as that shown in FIGURE 1 with and without the control mechanism of this invention; and FIGURE 3 is a developed view of a typical velocity control cam as might be selected for a system having a high real load near the end of its cycle.

In FIGURE 1 there is shown a typical cyclically operable machine 10 having a rotatable drive shaft or load member 21 that is intermittently abruptly connected to and disconnected from a continuously rotating drive shaft or power member 22 by a selectively engageable positive acting clutch 23. The continuously rotating drive shaft 22 is driven by a motor 24 through a timing belt 25 and is connected to the input side of clutch 23. Cyclic machine 10 may include components such as drive gears 11 and energy storing components such as spring loaded cam followers 12. The machine 10 also generates friction loading between the various components.

The clutch 23 is shown as a conventional spring clutch, including a wrap spring 26 and a double lobe or half revolution control sleeve 27 that is normally engaged by a spring loaded latch 28 to maintain the wrap spring 26 out of gripping engagement with the drive shaft 22. The wrap spring 26 is continuously engaged with an arbor 29 of an acceleration control resilient torque coupling 30. The resilient torque coupling 30 comprises a first jaw 31 and a second jaw 32 having respective teeth 33 and 34 thereon for transmitting and receiving torque, respectively. Driving torque is transmitted from tooth 33 through resilient energy storing means such as an elastomeric insert 35 to the tooth 34, thus providing a proportional degree of force moderating slippage or angular displacement between jaws 31 and 32 during periods of high acceleration. It will be appreciated that the degree of displacement is a function of the acceleration induced load considering the clutch pick-up time and the load inducing characteristics of the machine 10 together with the spring rate or resiliency of the elastomeric insert 35. The second or downstream jaw 32 of the coupling 30 is connected to the driven or load shaft 21 and thus supplies its angular displacement, velocity, and accelerations to the cyclically operable machine 10. Accordingly, the moderated acceleration due to slippage is all that is felt by the machine 10.

Connected somewhere between the resilient torque coupling 30 and preferably the entire machine 10, is artificial load inducing cam or control member 41 having identical lobes 43 which are simultaneously engaged by follower rollers 45. The follower rollers 45 are mounted on levers or loading control members 46 and pivot about axes 47 under the control of the camming surface 44 and against variable load spring 48. Each lobe 43 has a camming surface 44 that includes a rise portion 44a (see FIGURE 3) located to maintain the torque across the coupling 30 for a substantial period of time immediately following clutch engagement and acceleration. The rise portion 44a continues through as much of the load shaft rotational angle as required to resist velocity surge due to the energy stored in coupling 30. During cycle times of high read load or a non-critical velocity curve dwell or fall contours such as 44b and 44c (FIGURE 3) can be employed.

It will be understood that the deflection of insert 35 will, at any time, be a function of the torque then transmitted through the coupling 30. This torque is generated by different factors at different times in the cycle. As explained above, the torque immediately upon clutch engagement is generated due to acceleration forces and can be expected to produce substantially the maximum deformation to be encountered throughout the cycle. If the deformation is permitted to reduce during the cycle, such reduction will be accompanied by a release of stored energy against tooth 34 and thus directly into the system causing acceleration and possible overrunning of the clutch 23. As the load shaft 21 is brought up to speed the acceleration forces abate and the torque transmitted through the coupling 30 is reduced accordingly. In the absence of velocity control cam 41, this reduced torque would permit insert 30 to return energy to the system in the form of a transient increase in velocity. However, the rise portion 44a of cam 41 is selected to generate an artificial load on the shaft 21 as explained above to maintain the torque transmitted through the coupling 30 at a level to maintain the insert 35 in its compressed condition where velocity surge would be harmful. Conveniently, the velocity control cam 41 can serve as a detenting cam for positively locating the shaft 21 at the end of each cycle. The energy stored in spring 48 and in insert 35 is expended in driving the cam 41 to its detented position in the event there is some tendency for the mechanism to stop in other than its detented position.

The duplicate cam lobes 43 are provided to accommodate the one-half revolution operation of shaft 21. However, it will be appreciated that more or less cam lobes should be employed according to the amount of cyclic rotation of the shaft 21. For example, a full rotation shaft would require a single lobe cam. The duplicate follower mechanisms 45 conveniently provide a symmetrical loading.

FIGURE 2 shows an oscilloscope trace A of the actual velocity curve of mechanism of the type shown in FIGURE 1 without the velocity control cam 41, and an actual trace B of the mechanism with the velocity control cam 41. It is quite apparent from FIGURE 2 that the velocity control cam 41 produces a much more predictable and constant velocity than is inherently produced by the system without the velocity control cam.

Those skilled in the art will appreciate that I have provided a simple acceleration control mechanism that avoids stored energy velocity surge by the use of a versatile load inducing cam that can be tailored to meet the needs of a particular system. It will further be understood that various modifications can be made to the preferred embodiment disclosed herein without departing from the spirit and scope of my invention as limited only by the following claims.

I claim:
1. In a power transmission having a continuously rotating power member, a rotatable load member, and a selectively engageable positive acting clutch for abruptly drive connecting and disconnecting the power and load members, the acceleration control mechanism comprising:
resilient energy storing means coupled in series power transmitting relationship between the clutch and the load member for reducing acceleration shock on the load member, and
artificial load means for maintaining at least a predetermined minimum load on the load member to control release of energy by said energy storing means, said artificial load means including a first control member connected to said load member for rotation therewith and a second control member cooperable with said first control member and controlled thereby for maintaining a predetermined minimum load on said load member during at least a substantial portion of the driving operation immediately following clutch engagement.

2. In a power transmission having a continuously rotating power member, a rotatable load member, and a selectively engageable, positive acting clutch for abruptly drive connecting and disconnecting the power and load members, the acceleration control mechanism comprising:
a torque coupling connected in series power transmitting relationship between the clutch and the load member, said torque coupling including resilient energy storing means connected between the clutch and the load member for transmitting torque therebetween, and
artificial load means for maintaining at least a predetermined minimum load on the load member, said artificial load means including a first control member connected to said load member for rotation therewith and a second member cooperable with said first member and controlled thereby for maintaining a predetermined load on said load member during at least a substantial portion of the driving operation immediately following clutch engagement.

3. In a power transmission having a continuously rotating power member, a rotatable load member, and a selectively engageable, positive acting clutch for abruptly drive connecting and disconnecting the power and load members, the acceleration control mechanism comprising:
resilient energy storing means coupled in series power transmitting relationship between the clutch and the load member,
controllably variable load means, and
a load control cam coupled to the load member for rotation therewith and having a camming surface defining a rise portion along at least a portion thereof, controlling connected to said variable load means, said rise portion being dimensioned and located to control said variable load means to maintain at least a predetermined minimum load on the load member during at least a substantial portion of the driving operation immediately following clutch engagement.

4. In a power transmission having a continuously rotating power member, a rotatable load member, and a selectively engageable, positive acting, single cycle clutch for abruptly connecting and disconnecting the power and load members to rotate the load member from a first predetermined angular position through a predetermined angle, the acceleration control mechanism comprising:
a resilient torque coupling coupled in series power transmitting relationship between the clutch and the load member for storing energy during connecting acceleration of the load member with the power member,
an artificial load inducing cam coupled to the load member for rotation therewith,
a follower operatively engaging said cam and yieldable loading means opposing movement of said cam follower by said cam, and said cam having a rise portion commencing at an angle relative to said load member starting position for cooperating with said follower in the region of the termination of angular acceleration and continuing in cooperation therewith throughout a substantial portion of the angular displacement of the load member.

5. A power transmission as defined in claim 4 wherein said cam further comprises adjacent fall and rise portions defining a detent surface located at the starting position of the load member.

References Cited

UNITED STATES PATENTS

| | | | |
|---|---|---|---|
| 2,985,271 | 5/1961 | Wilson | 192—48 X |
| 3,004,646 | 10/1961 | Seiden | 192—12 X |
| 3,021,512 | 2/1962 | Welsh et al. | 192—12 |
| 3,232,399 | 2/1966 | Harned et al. | 192—103 |
| 3,265,172 | 8/1966 | Atsumi et al. | 192—55 |

MARTIN P. SCHWADRON, *Primary Examiner.*
FRED C. MATTERN, *Examiner.*